Figure 1:
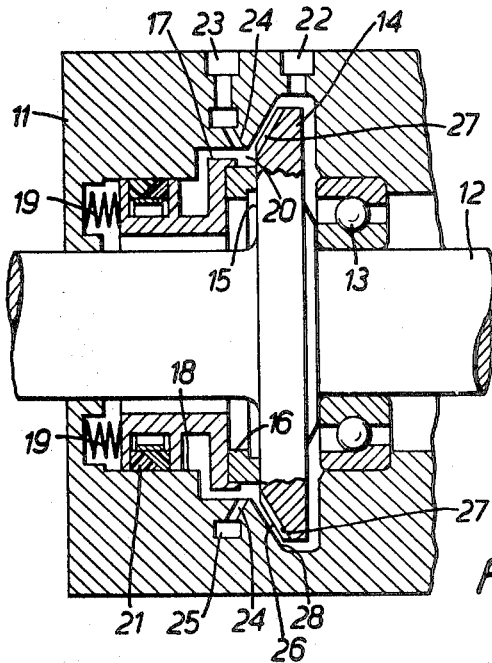

United States Patent

[11] 3,608,910

| [72] | Inventor | Stanley R. Tyler<br>Cheltenham, England |
|---|---|---|
| [21] | Appl. No. | 872,178 |
| [22] | Filed | Oct. 29, 1969 |
| [45] | Patented | Sept. 28, 1971 |
| [73] | Assignee | Dowty Fuel Systems Limited<br>Cheltenham, England |
| [32] | Priority | Oct. 31, 1968 |
| [33] | | Great Britain |
| [31] | | 51670/68 |

[54] SHAFT SEAL ARRANGEMENTS
4 Claims, 3 Drawing Figs.

[52] U.S. Cl. .................................................... 277/15,
277/22, 277/25, 277/61, 277/74, 415/170
[51] Int. Cl. ........................................................ F16j 15/00
[50] Field of Search ............................................ 277/61, 65,
74, 81, 81 R, 71, 22, 96, 15, 16, 25; 415/170

[56] References Cited
UNITED STATES PATENTS
3,477,729  11/1969  Hershey ........................ 277/22 X FOREIGN PATENTS
243,031  10/1965  Austria ......................... 277/61

*Primary Examiner*—Robert T. Smith
*Attorney*—Young and Thompson

ABSTRACT: A seal assembly for use with a rotatable shaft has a sealing ring axially loaded against a flange portion of the shaft, a number of orifices directing fluid for cooling and lubrication radially inwardly against the sealing ring, and a scavenge pump having an impeller which is formed by a part of the flange disposed radially outwardly of the sealing ring, and which operates during rotation of the shaft to return the fluid to the source and to maintain low fluid pressure adjacent the sealing ring. When applied to the shaft of a fuel pump, the foregoing arrangement is used to seal a lubricated part of the shaft which is supported in bearings, while a second seal engages the part of the shaft adjacent the pump, the space around the shaft between the two sealing rings being vented.

PATENTED SEP 28 1971

3,608,910

INVENTOR
STANLEY RALPH TYLER
BY Young & Thompson
ATTORNEYS

SHAFT SEAL ARRANGEMENTS

This invention relates to a seal assembly for use between a fixed member and a rotatable shaft member, and especially for use at high rotational speeds.

In high speed applications it is especially desirable to keep seal friction to a minimum by having a low pressure between the rubbing surfaces so that there is a minimum of heat generated.

The present invention broadly provides during shaft rotation a continuous flow of liquid on one side of the sealing ring for cooling and/or lubrication purposes, while centrifugal means operable by rotation of the shaft is arranged to assist the flow of liquid and to maintain a low fluid pressure in the vicinity of the seal.

More specifically, the invention is concerned with a pump shaft seal assembly for separating one liquid which is circulated through the bearing of the pump shaft from another liquid which is pumped. Such an arrangement is commonly used in a centrifugal pump supplying liquid fuel to the burners of an aircraft gas turbine engine, in which the circulated liquid is a lubricant arranged to flow through the pump shaft bearing. The total quantity of lubricant circulated is usually small, so that if there is a seal breakdown, lubricant can either be lost in a short time, or be rapidly contaminated with fuel, dependent upon the direction of leakage.

It has been proposed to have two seals in order to reduce the risk of loss of one liquid into the other, but this solution is not entirely satisfactory because in the event of one seal breaking down, the resulting static volume of liquid between the seals and between the rotating and nonrotating parts can cause overheating. It is no solution to vent the interseal space because liquid loss will then occur which is not easily detected.

According to the present invention a seal assembly for use between a fixed member and a rotatable shaft member comprises a sealing ring mounted in the fixed member and acting against the rotatable shaft member to separate a vented space between said members on one side of the sealing ring from a lubrication zone formed between said members on the other side of the sealing ring, orifice means in the fixed member connected to a source of lubricant and arranged to direct jets of lubricant into said zone and over the sealing ring, and a scavenge pump which is disposed adjacent the lubrication zone and which is operable by the rotatable member to return lubricant from said zone to the source.

When the seal assembly is used in a pump for liquids driven by the shaft member, a second sealing ring may be mounted in the fixed member and acts against the rotatable shaft member to isolate liquid within the pump from the vented space on one side of the first-mentioned sealing ring.

Figure 2:
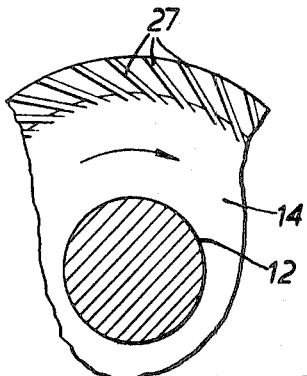
Figure 3:
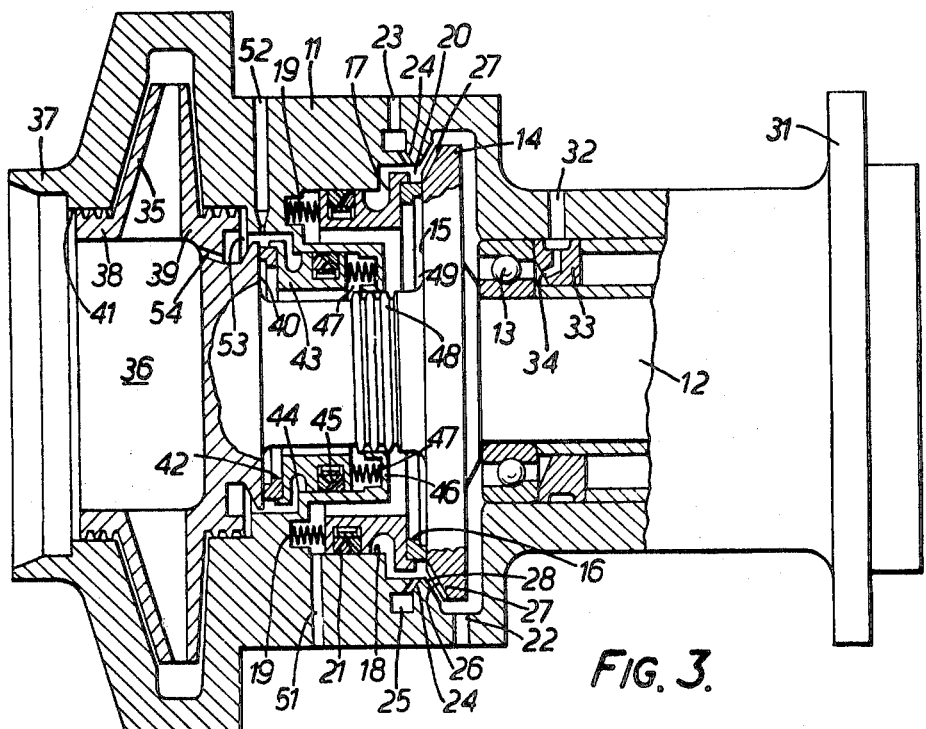

The invention is illustrated in the accompanying diagrammatic drawings, of which, FIG. 1 is a sectional view of a seal assembly, FIG. 2 is an end view of part of the shaft member in the seal assembly, and FIG. 3 is a sectional view of a centrifugal pump incorporating the seal assembly.

The seal assembly of FIG. 1 has a fixed member 11 forming a housing in which a shaft member 12 is supported by bearings, only one bearing 13 being shown. A flange portion 14 of the shaft member 12 has a planar seating face 15 transverse to the rotational axis. A sealing ring 16 is slidably mounted by a carrier ring 17 in a bore 18 in the housing 11. Springs 19 interposed between the end of the bore 18 and the carrier ring 17, load the sealing ring 16 against the the seating face 15. A sealing device 21 mounted in the carrier ring 17 provides a sliding seal against the bore 18. The diameter of the bore 18 is substantially equal to the mean diameter of the rubbing face of the sealing ring 16 whereby fluid pressure loads acting in the axial direction on the carrier 17 are substantially balanced. The sealing pressure is therefore substantially provided by the springs 19.

Lubricant from an external source may be directed, by means not shown but in a known manner, at the bearing 13 to cool and lubricate it. The liquid flows radially outwardly through the gap between member 11 and the flange 14, and is returned to the source through a connector 22 in the housing 11.

Another connector 23 receives liquid from the source and supplies it to an annular passage 25 in the member 11. A number of jet orifices 24 supplied by the annular passage 25 are directed towards the sealing ring 16 where it engages the face 15. The annular space between the carrier 17 and the sealing ring 16 on the one hand and the housing 11 on the other hand forms a lubrication zone 20. Radially outwardly of the sealing ring 16, the flange 14 has a frustoconical face 26 formed with a plurality of slots 27 which are equally inclined to the radial direction so that liquid entering the slots is impelled outwardly when the shaft 12 is rotated in the direction of the arrow, FIG. 2. The frustoconical face 26 has a working clearance with respect to a frustoconical face 28 in the housing 11.

The seal assembly is suitable for use as a pump shaft seal, or as a shaft seal in a gearbox, especially for high speed applications. The low pressure at which lubricant is supplied to the orifices 24 is generated by an auxiliary pump which will have a drive coupled with that of the shaft 12, whereby there is no pressure when the shaft is stationary. The pressure of the springs 19 then suffices to prevent leakage across the seal and flange interface.

When the shaft 12 is rotated, the auxiliary pump is also driven so that lubricant is supplied to the orifices 24. The jets impinge on the sealing ring 16 and the seating face 15 so that the outer part at least of the contact area is lubricated and so that heat generated by the rubbing contact is conducted to the lubricant. The rotation of the flange 14, forming the scavenge pump rotor, impels the lubricant to the connector 22, and thence to the source, so that low fluid pressure is established in the lubrication zone. This pressure may be substantially that on the other side of the sealing ring 16, so that if, during running, there should be a breakdown of the seal which remains undetected, there will be little if any appreciable loss of lubricant across the sealing ring.

In the centrifugal pump of FIG. 3, to corresponding to FIGS. 1 and 2 bear the same reference numerals. The housing 11 has a mounting flange 31 for attachment to a driving unit. The pump may be a fuel pump for a gas turbine engine, in which case the driving unit is an auxiliary gearbox driven by the engine, the gearbox having a conventional splined driving connection, not shown, with the shaft 12. The engine will also drive a low pressure lubrication pump, not shown, which supplies lubricant to the connector 23, and which causes circulation of the same lubricant from the gearbox through a heat exchanger for cooling purposes. The lubrication pump also supplies a connector 32 in the housing 11 which opens into a lubricating ring 33 having a number of nozzles 34 directed towards the bearing 13. Lubricant discharged from the nozzles 34 is returned with lubricant from the scavenge pump through the connector 22 to the source.

The shaft 12 drives a centrifugal pump rotor 35 which has a central opening 36 for fuel. The housing 11 has a spigot 37 adapted to fit a fuel inlet connection which may include a flow control valve. The rotor 35 has a shoulder 38 on its inlet side and a shoulder 39 on the shaft side, both of which are formed with a labyrinth seal against a bore 41 in the housing 11.

The shaft side of the rotor 35 is formed with a flange portion having a planar seating face 40 for a second sealing ring 42. This sealing ring is slidably mounted by a carrier ring 43 in a bore 44 in the housing 11. A sealing device 45 mounted in the carrier ring 43 provides a sliding sealing against the bore 44. The bore is formed in a skirt portion 46 of the housing which retains loading springs 47 for the carrier 43 and which surrounds a labyrinth seal 48 on the shaft. The skirt 46 and carrier 43 are disposed radially inwardly of the carrier 17 for the seal 16, and the intervening space 49 is vented by a passage 51.

A passage 52 in the housing 11 supplied with from the source of fuel which supplies the opening 36, opens into an annular space 53 around the second sealing ring 42, and a passage 54 through the back of the pump leads to the opening 36, whereby there is a flow of fuel for cooling purposes over the sealing ring 42. If there should be a failure of the sealing ring 42, any serious leakage of fuel to the vented passage 51 is prevented by the labyrinth seal 48. In the remote possibility of failure of both sealing rings 16 and 42, any fuel passing through the labyrinth seal 48 will be vented and will not enter the lubrication zone 20, while loss of lubricant into the vented space 49 is substantially prevented by the action of the scavenge pump.

I claim:

1. A seal assembly for use between a fixed member and a rotatable shaft member to retain a liquid, comprising means on the shaft member defining a sealing face lying in a plane transverse to the rotational axis of the shaft member, a sealing ring mounted in the fixed member to engage the sealing face and thereby to separate a zone, disposed radially outwardly of the sealing ring and which when the seal assembly is in use contains said liquid, from a zone disposed radially inwardly of the sealing ring and which is vented, a passage formed in the fixed member radially outwardly of the sealing ring and adapted for connection to a source of said liquid, a plurality of orifices opening from said passage into said liquid-containing zone, each of said orifices being arranged to provide a jet of liquid directed towards the sealing ring where said sealing ring engages the sealing face, an impeller provided on said shaft member adjacent the liquid-containing zone and cooperable with the fixed member to form a scavenge pump, and a discharge passage in the fixed member on the outlet side of the scavenge pump, said discharge passage being adapted to return liquid to the source, and the scavenge pump being operable upon rotation of the shaft to expel liquid received by the liquid-containing zone from the jet orifices and thereby to establish a low pressure in said first-mentioned zone.

2. A seal assembly according to claim 1, wherein the sealing face is formed on a flanged portion of the shaft member, and the impeller is formed on the flanged portion radially outwardly of the sealing face.

3. In a pump for liquids having a shaft member rotatable in a housing, a shaft seal assembly comprising means on the shaft member defining a first sealing face lying in a plane transverse to the rotational axis of the shaft, a first sealing ring mounted in the housing to engage the sealing face and thereby to separate a zone, disposed radially outwardly of the sealing ring and which when the pump is in use contains lubricant, from another zone disposed radially inwardly of the sealing ring and which is vented, a passage formed in the housing radially outwardly of the sealing ring and adapted for connection to a source of said lubricant, a number of orifices opening from said passage into said lubricant-containing zone, each of said orifices being arranged to provide a jet of lubricant directed towards the second sealing ring where the sealing ring engages the sealing face, an impeller provided on said shaft member adjacent the lubricant-containing zone and cooperable with the housing to form a scavenge pump, a discharge passage in the housing on the outlet side of the scavenge pump, said discharge passage being adapted for connection to the source of lubricant, and the scavenge pump being operable upon rotation of the shaft to expel liquid received into the lubricant-containing zone from the jet orifices and thereby to establish a low pressure in the lubricant-containing zone, and a second sealing ring mounted in the housing and engaging the shaft member to separate a further zone, which when the pump is in use contains the liquid to be pumped, from the said other zone which is vented.

4. A shaft seal assembly according to claim 3, including second means on said shaft member defining a second sealing face which lies in a plane transverse to the rotational axis of the shaft and which is engaged by the second sealing ring, a passage formed in the housing radially outwardly of the second sealing ring and adapted to be connected to the source of liquid to be pumped, said passage opening into the further liquid-containing zone, and a passage in the shaft member arranged to return liquid from said liquid-containing zone to the inlet of the pump.